(12) United States Patent
Landskron

(10) Patent No.: US 8,685,356 B2
(45) Date of Patent: Apr. 1, 2014

(54) LARGE-PORE PERIODIC MESOPOROUS QUARTZ

(75) Inventor: Kai Landskron, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 13/302,500

(22) Filed: Nov. 22, 2011

(65) Prior Publication Data

US 2012/0129688 A1    May 24, 2012

Related U.S. Application Data

(60) Provisional application No. 61/417,003, filed on Nov. 24, 2010, provisional application No. 61/477,398, filed on Apr. 20, 2011.

(51) Int. Cl.
*C01B 33/12*         (2006.01)

(52) U.S. Cl.
USPC ......................................................... 423/335

(58) Field of Classification Search
USPC ............... 423/326, 327.1, 328.1, 328.2, 325, 423/335–340
See application file for complete search history.

(56) References Cited

U.S. PATENT DOCUMENTS

2003/0095908 A1\* 5/2003 Pinnavaia et al. .............. 423/335
2007/0116625 A1\* 5/2007 Joo et al. .................... 423/445 R

OTHER PUBLICATIONS

Han et al, "Pressure-Induced Infiltration of Aqueous Solutions of Multiple Promoters in a Nanoporous Silica," Jul. 22, 2066, J. Am. Chem. Soc. vol. 128, No. 32, pp. 10348-10349.\*
Parmentier et al, "Study of the structural evolutions of mesoporous MCM-48 silica infiltrated with carbon by different techniques," 2003, Microporous and Mesoporous Materials, vol. 62, pp. 87-96).\*
Fan, Jie et al., Low-Temperature Strategy to Synthesize Highly Ordered Mesoporous Silicas with Very Large Pores, J.Am. Chem. Soc. 2005, 127, 10794-10795, American Chemical Society.
Mohanty, Paritosh et al., Synthesis of Periodic Mesoporous Coesite, J. Am. Chem. Soc. 2009, 131, 9638-9639, American Chemical Society.

\* cited by examiner

*Primary Examiner* — Steven Bos
*Assistant Examiner* — Justin Bova
(74) *Attorney, Agent, or Firm* — Saul Ewing LLP

(57) ABSTRACT

Provided herein are methods of synthesizing large-pore periodic mesoporous quartz. Using the methods herein, large-pore periodic mesoporous quartz has been synthesized at a lower pressure and a temperature than in any previous mesoporous crystalline method, yielding a unique mesoporous article having crystalline pore walls. For example, the methods involve modified nanocasting methods using a mesoporous starting material comprising silica, carbon as a an infiltrating pore filler, followed by application of pressure and heat sufficient to crystallize silica in the infiltrated starting material to form a mesoporous crystalline article having crystalline pore walls therein, and useful in many applications, including as a catalyst.

15 Claims, 7 Drawing Sheets

US 8,685,356 B2

LARGE-PORE PERIODIC MESOPOROUS QUARTZ

CROSS REFERENCE TO RELATED APPLICATIONS

This application claims the priority of U.S. Provisional Patent Application No. 61/417,003 filed on Nov. 24, 2010, and U.S. Provisional Patent Application No. 61/477,398, filed Apr. 20, 2011 which are incorporated herein by reference in their entireties.

BACKGROUND OF THE INVENTION

Periodic mesoporous silica materials were first discovered by Mobil Oil in 1992 for use in petroleum cracking applications. It was envisaged that these larger pore materials would allow for a more effective processing of the heavier hydrocarbon molecules than microporous zeolite catalysts. However, this did not happen because the mesoporous silicas proved to be insufficiently hydrothermally stable, a consequence of their amorphous (e.g. non-crystalline) channel walls. In addition, the acidity of the amorphous walls of Al-doped mesoporous silicas, proved to be much less than that of crystalline Al-modified zeolites. As a consequence, their catalytic properties fell far behind that of zeolites for petroleum cracking. Further, the synthesis of such silica materials was industrially and economically inefficient, and their development and use stalled as a result.

There remains a need for highly acidic, stable, economical, durable periodic mesoporous silica catalysts with crystalline pore walls that exhibit a high chemical and thermal stability, and have low cost of production and use.

SUMMARY OF THE INVENTION

Provided herein are novel mesoporous silica structures compositions, and methods of manufacture and use thereof.

In an embodiment, a method for synthesizing a mesoporous silica article with crystalline pore walls is provided comprising the steps of: providing a mesoporous silica starting material consisting of silica, oxygen, and optionally aluminum; infiltrating the mesoporous starting material with a carbon source to form an infiltrated starting material; placing the infiltrated starting material into a high-pressure apparatus; and subjecting the infiltrated starting material to a pressure of not greater than 4 GPa; and heating the infiltrated starting material at a preselected temperature and for a time sufficient to crystallize the pore walls of the starting material to thereby form a mesoporous article that has crystalline pore walls and pores filled with carbon; and heating the mesoporous article to a temperature sufficient to oxidize the carbon, thereby removing carbon from the pores to yield a mesoporous silica article having crystalline pore walls.

In another embodiment, provided is the mesoporous article synthesized by the methods herein. In an example, the article is characterized by crystalline walled mesopores having an average size of between about 10 to about 13 nm, and further characterized by the presence of pore volume in excess of 0.30 cm$^3$ g.

Other examples and embodiments will be apparent from the ensuing description and drawings and claims presented herein.

DETAILED DESCRIPTION

Figure 1A:
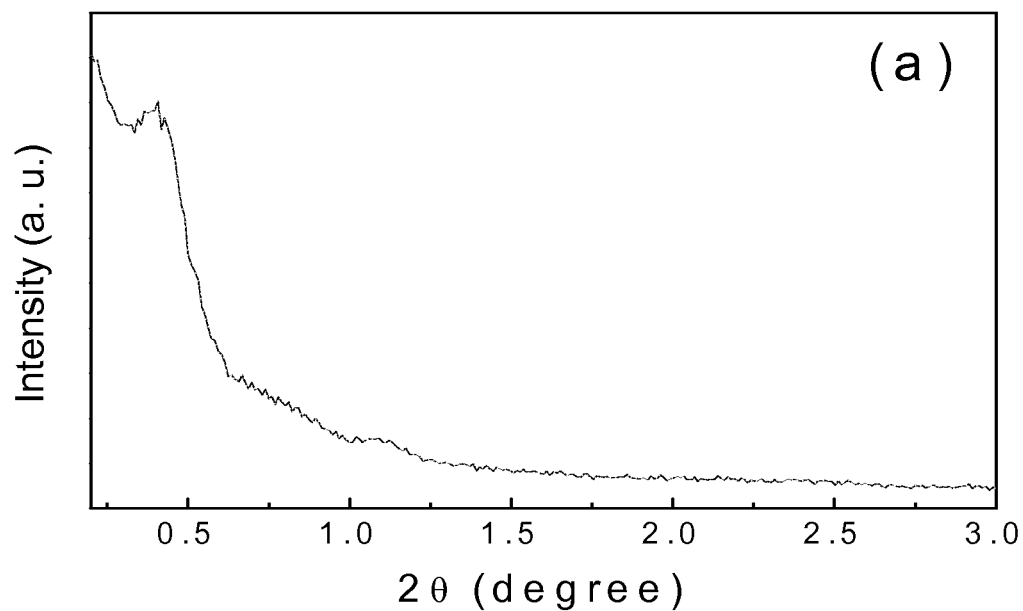
FIG. 1(a) is a graph that shows SAXS patterns of periodic mesoporous quartz in accordance with the present invention

The present invention provides new periodic mesoporous quartz particles, as well as new methods of synthesis using lower pressures and temperatures than any previously reported. Also presented are new periodic mesoporous alumosilica articles, methods of manufacture, and new uses thereof.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

In forming silica-based crystalline compositions, pressure very effectively promotes crystallization. This is because crystalline phases are normally denser phases as compared to amorphous phases. The stress induced into chemical bonds by pressure kinetically activates the bonds which further facilitates crystallization.

Recently, the inventors have discovered that periodic mesoporous coesite with pore sizes of 4.0 nm (a crystalline high pressure phase of silica) can be synthesized by nanocasting at high pressure, such as at about 12 GPa. See "Synthesis of Periodic Nanoporous Coesite", Journal of the American Chemical Society 2009, 131, pp 9638-9639, the teachings of which are herein incorporated by reference. However, the required pressure (12 GPa) in those methods is not compatible with industrial synthesis methods at high pressure that allow to produce the material at large scale. Moreover, at ambient pressure there is a thermodynamic driving-force for a high-pressure phase silica phase to amorphize. This is undesirable for applications such as petroleum cracking where the material is subjected to harsh chemical environments at high temperature.

Herein, we report our surprising discovery that large-pore periodic mesoporous quartz, as well as aluminum doped crystalline periodic mesoporous silica articles, can be produced much lower pressures below about 4 GPa, and at temperatures of less than about 1000 degrees C., using novel methods and systems presented herein. The present methods and systems for synthesis are compatible with industrially used piston-cylinder high-pressure apparatus (as compared with the need for high-pressure multi-anvil equipment needed for the 12 GPA methods referred to above). The surprising discovery of these much lower pressure methods allows for cost-efficient methods that allow for low-cost, large-scale production. Further, because quartz is an ambient pressure phase, no phase transitions are to be expected at ambient pressure conditions.

Further provided herein are methods of synthesizing new large-pore periodic mesoporous quartz particles, including at lower pressures and temperatures than any previously reported. For example, as described herein, large-pore periodic mesoporous quartz has been synthesized at a pressure of 4 GPa and a temperature of 750° C. by modified nanocasting methods, such as by using a large pore periodic mesoporous starting material, infiltrated with carbon as a pore filler, as described herein.

To investigate if periodic mesoporous quartz can be synthesized at even lower pressure we have performed two additional experiments at 2 GPa and 1 GPa and 700-750° C. in piston-cylinder apparatuses. At 2 GPa a crystalline quartz phase formed according to XRD while at 1 GPa no crystallization was observed. This means that the lowest possible pressure to achieve crystallization is between 1 and 2 GPa.

Examples using 4 GPa. In experimentation with mesoporous silicas, the periodic mesoporous silica FDU-12 (as taught by Fan et al in "Low Temperature Strategy to Synthesize Highly Ordered Mesoporous Silicas with Very Large Pores", Journal of the American Chemical Society 2005, 127, pp. 10794-10795, hereby incorporated by reference) was synthesized similarly to a method reported by Zhao et al. The mesopores of the FDU-12 were then filled by infiltrating molten mesophase pitch as a carbon source at its softening point (302° C.) and then carbonized at 900 C in an $N_2$ atmosphere. The resulting mesostructured silica/carbon composite had negligible surface area, and no measurable micro- or mesoporosity. In subsequent steps, the infiltrated carbon of the mesostructured silica/carbon composite acts as a support inside of the pores of the silica so that the pores do not collapse when subjected to pressure to yield the novel periodic mesoporous silica article having crystalline pore walls.

In the next step, the silica/carbon composite was placed into a platinum capsule. The capsule was placed into a large volume (18/11) multi-anvil assembly. The pressure was then ramped up to 4 GPa with a rate of 1 GPa per hour ("h"). While at pressure, the sample was heated subsequently at 750° C. for a time period of 3 h, to crystallize silica within the pressurized, infiltrated starting material. After the heat-treatment, the sample was quenched to room temperature by turning off the electric current flowing through the resistive heater and then depressurized at a rate of 1 GPa/h.

The sample was then heated at 550° C. in air for 5 h in order to oxidize the infiltrated carbon. After the heat treatment the recovered sample appeared grayish white. This indicates the removal (by oxidation) of the carbon. The small angle x-ray diffraction (SAXS) pattern of the sample (FIG. 1a) shows a sharp peak at the 2θ diffraction angle of 0.39 degrees. This demonstrates the high periodic mesoscale ordering of the specimen. In order to study the crystallinity of the channel walls of the specimen, wide angle x-ray diffraction (WXRD) was performed. The WXRD pattern (FIG. 1b) shows sharp and well resolved diffraction peaks which can be attributed to hexagonal quartz.

Figure 2A:
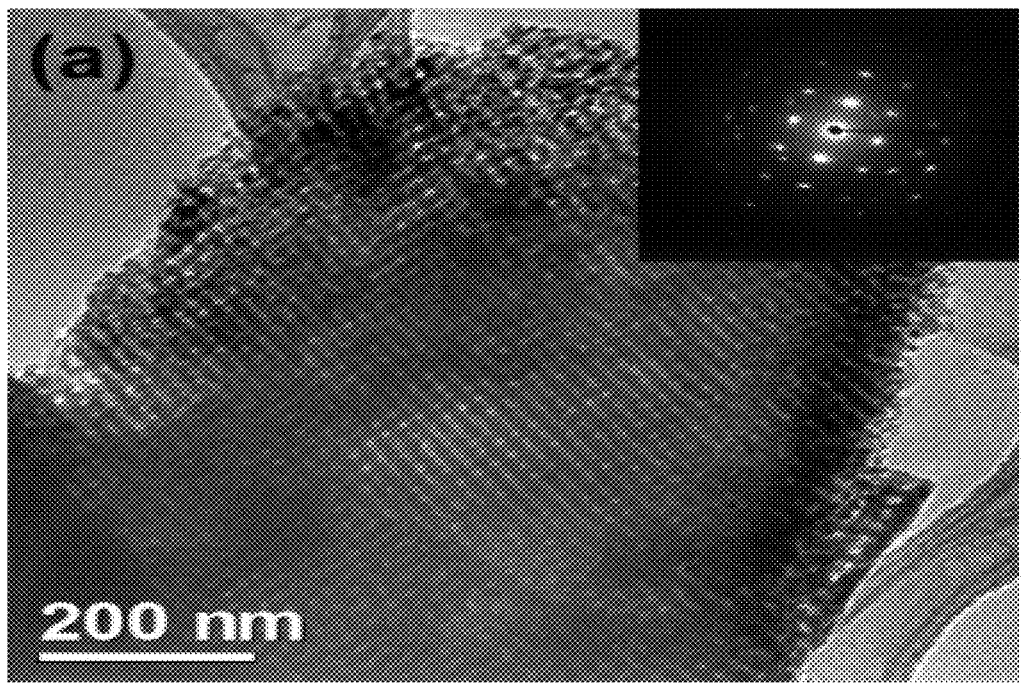
FIG. 2(a) is a TEM image of periodic mesoporous quartz in accordance with the present invention.

In order to further study the ordered mesostructure, the specimen was investigated by transmission electron microscopy (TEM). The TEM image (FIG. 2a) demonstrates excellent periodic mesostructural order and no noteworthy amounts of disordered particles were present. The pore sizes measured from the TEM images ranged between 10 to 13 nm with the wall thickness being in the same range. This can further be seen by scanning electron microscopy (FIGS. 2c and 2d). The crystallinity of the channel walls was further investigated by selected area electron diffraction (SAED) (inset of FIGS. 2a and 2b). The SAED patterns revealed regular arrays of diffraction spots that demonstrate the single crystallinity of the channel walls.

Figure 3:
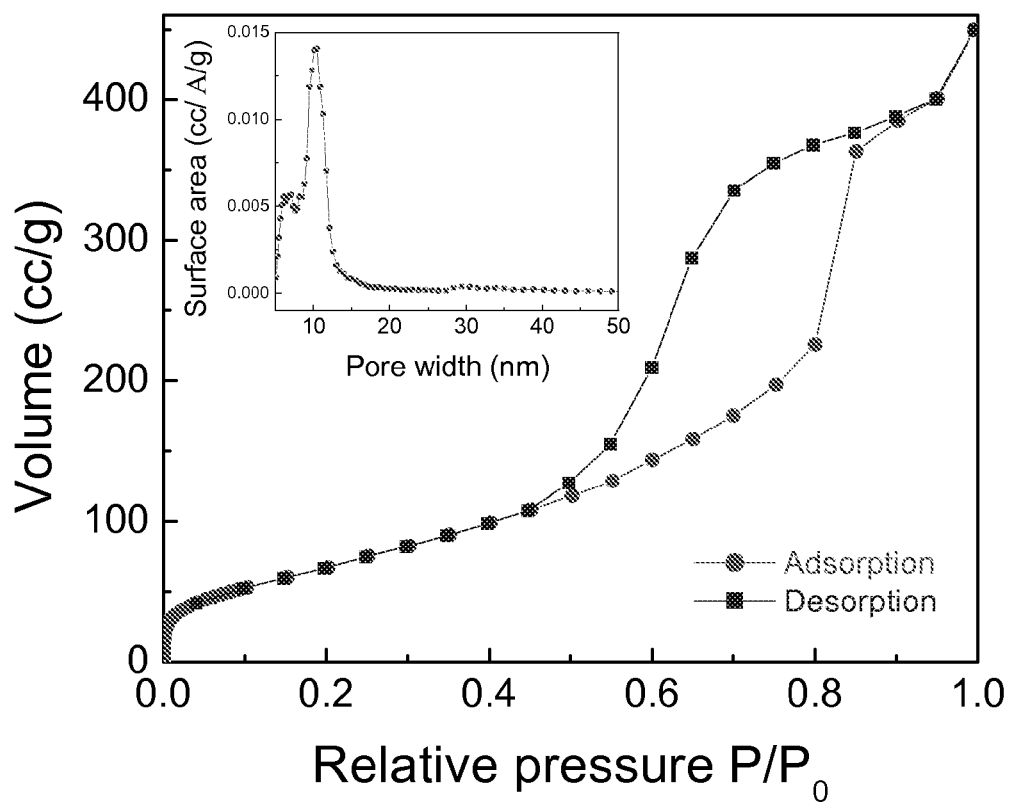
FIG. 3 is a graph showing N$_2$ sorption isotherm of ordered mesoporous quartz in accordance with the present invention.
Figure 4:
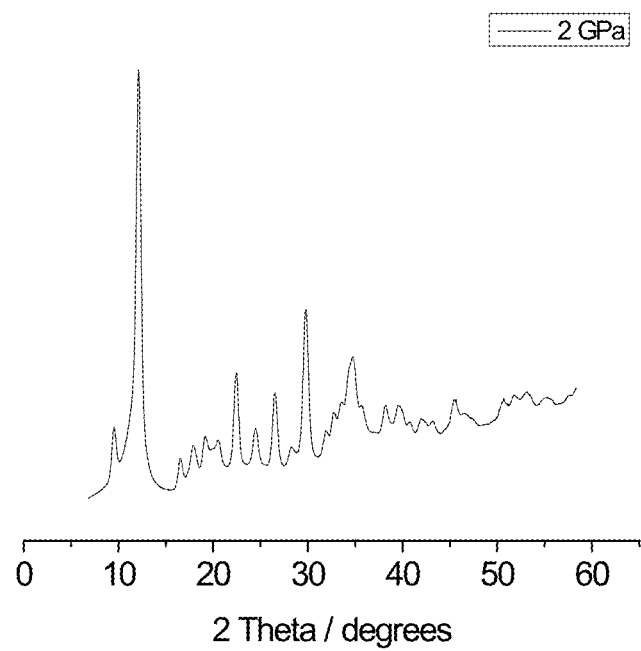
FIG. 4(a) is a graph showing x-ray diffraction pattern of large-pore periodic mesoporous quartz produced at 2 GPa in accordance with the present invention.
FIG. 4(b) is a graph showing x-ray diffraction pattern of an amorphous product produced at 1 GPa in accordance with the present invention.
Figure 4:
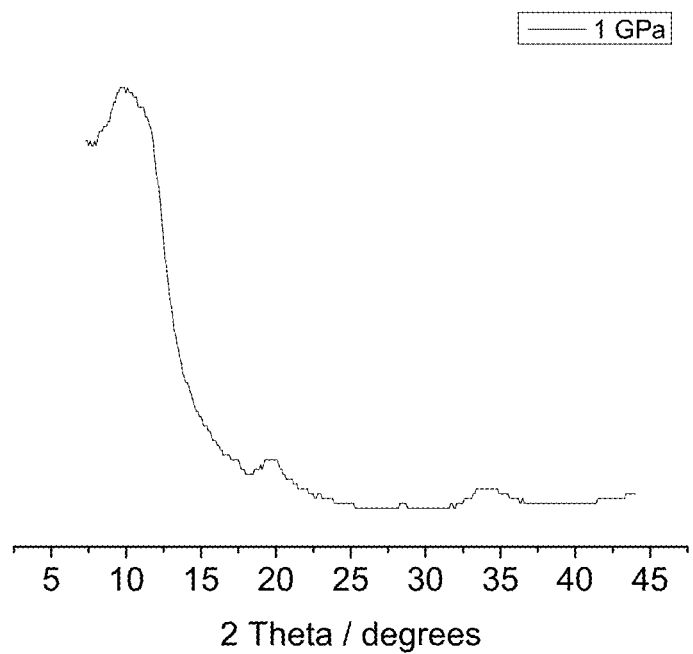

Examples below 4 GPa. As described herein, we further experimented with crystal formation at lower pressures of 2 GPa and 1 GPa, and concurrent temperature exposures such as about 700-750° C. in piston-cylinder apparatuses. To investigate if periodic mesoporous quartz can be synthesized at even lower pressure we performed two additional experiments at 2 GPa and 1 GPa and 700-750° C. in piston-cylinder apparatuses. At 2 GPa a crystalline quartz phase formed according to XRD while at 1 GPa no crystallization was observed The experiments and data surprisingly shows the discovery that the minimal crystallization pressure is within the range of between 1-2 GPa. This pressure range can be easily achieved using inexpensive piston-cylinder apparatuses. SEM (FIG. 2) of the calcined periodic mesoporous quartz material shows that the periodic mesostructure is intact. The periodic order of both the materials synthesized at 1 and 2 GPa respectively was further confirmed by SAXS, which shows a clear reflection at a 2 Theta angle of 0.39 degrees (FIG. 3). $N_2$ sorption data for the periodic mesoporous quartz shows type IV isotherms with a steep capillary condensation step and narrow pore size distributions centered around 15 nm and pore entrance sizes of 8 nm and surface areas of 234 $m^2$ $g^{-1}$ respectively (FIG. 4). The pore volume was found to be 0.87 $cm^3$ $g^{-1}$.

To investigate the hydrothermal stability of the material, large-pore periodic mesoporous quartz material was treated in a pure steam stream at 800° C. for 2 h. For comparison, the LP-FDU-12 starting material with amorphous channel walls was subjected to the same conditions. The mesoporous quartz material was recovered without obvious visual change. In contrast, the LP-FDU-12 starting material was found to be depolymerized, and eventually volatilized completely (our alumina boat was found empty after the treatment) indicating that the crystallization has a great effect on the hydrothermal stability. SEM and TEM (FIG. 5) of the hydrothermally treated mesoporous quartz material clearly showed that the mesopores withstood this treatment without significant deformation. The great hydrothermal stability of the material suggests potential use for catalytic applications in harsh environments, for example the cracking of crude petroleum.

By way of further explanation and examples, the following descriptions are provided.

FIG. 1(a) is a graph that shows SAXS patterns of periodic mesoporous quartz in accordance with the present invention.

Figure 1B:
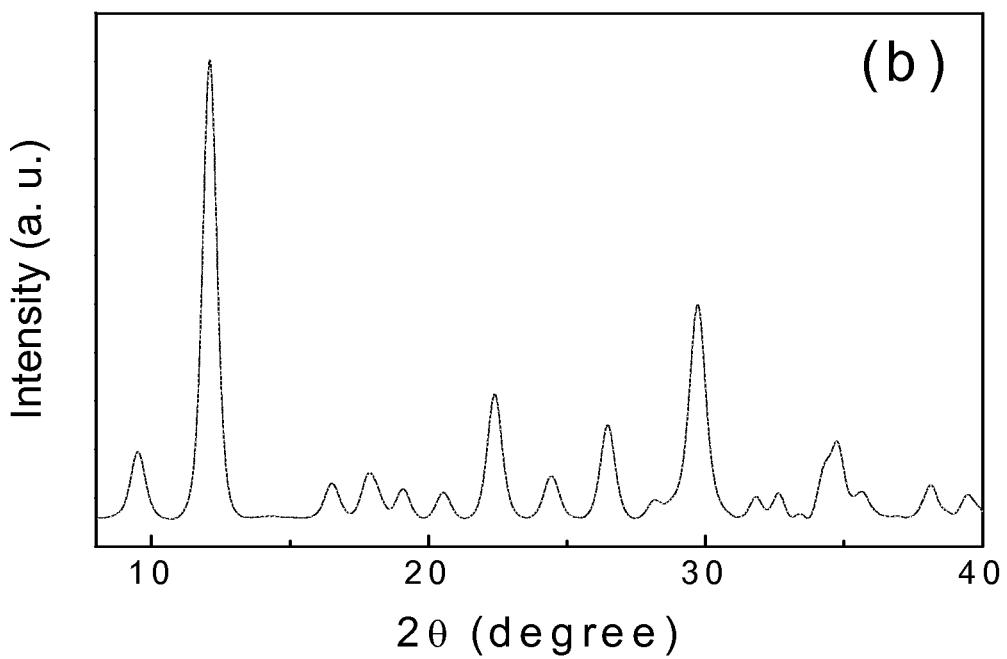
FIG. 1(b) is a graph that shows WXRD patterns of periodic mesoporous quartz in accordance with the present invention.

FIG. 1(b) is a graph that shows WXRD patterns of periodic mesoporous quartz in accordance with the present invention.

FIG. 2(a) is a TEM image of periodic mesoporous quartz in accordance with the present invention.

Figure 2B:
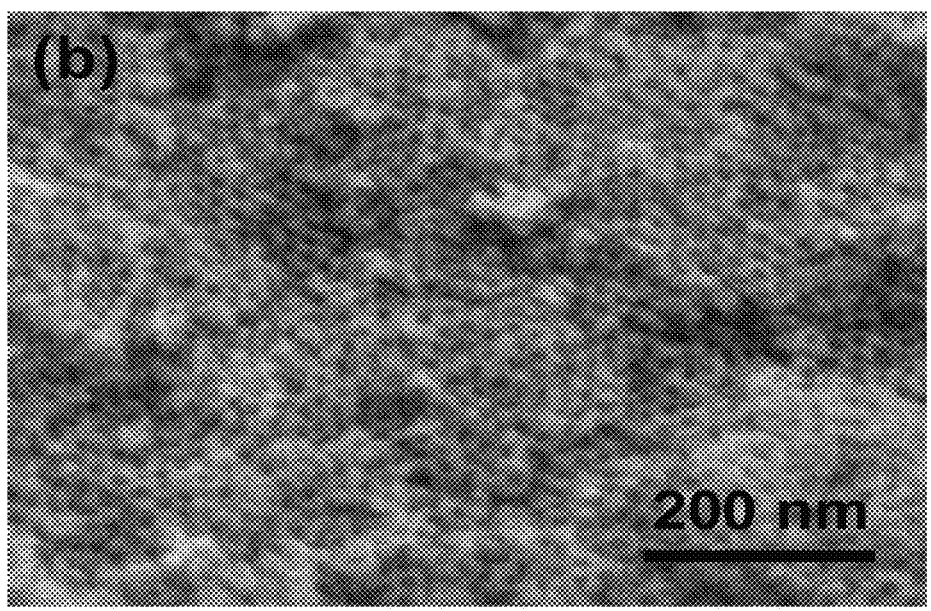
FIG. 2(b) is a SEM image of periodic mesoporous quartz in accordance with the present invention.

FIG. 2(b) is a SEM image of periodic mesoporous quartz in accordance with the present invention.

FIG. 3 is a graph showing $N_2$ sorption isotherm of ordered mesoporous quartz in accordance with the present invention.

FIG. 4 illustrates x-ray diffraction pattern of large-pore periodic mesoporous quartz produced at 2 GPa (left) and the X-ray amorphous product synthesized at 1 GPa (right) in accordance with the present invention.

Figure 5:
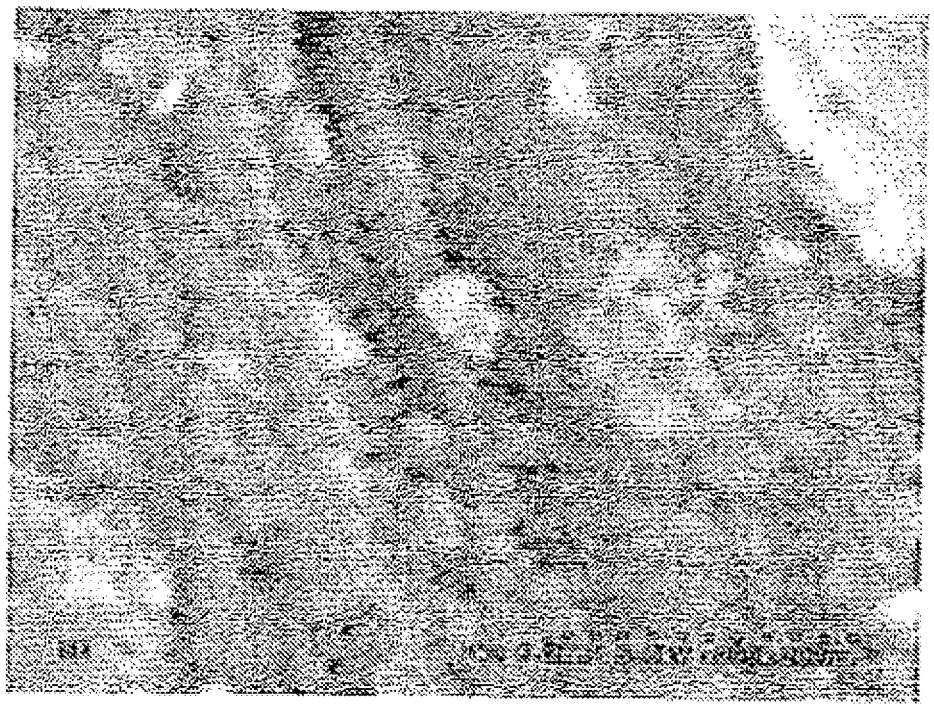
FIG. 5 is a SEM image of large-pore periodic mesoporous quartz synthesized at 2 GPa in accordance with the present invention.

FIG. 5 illustrates SEM of large-pore periodic mesoporous quartz synthesized at 2 GPa. in accordance with the present invention.

Figure 6:
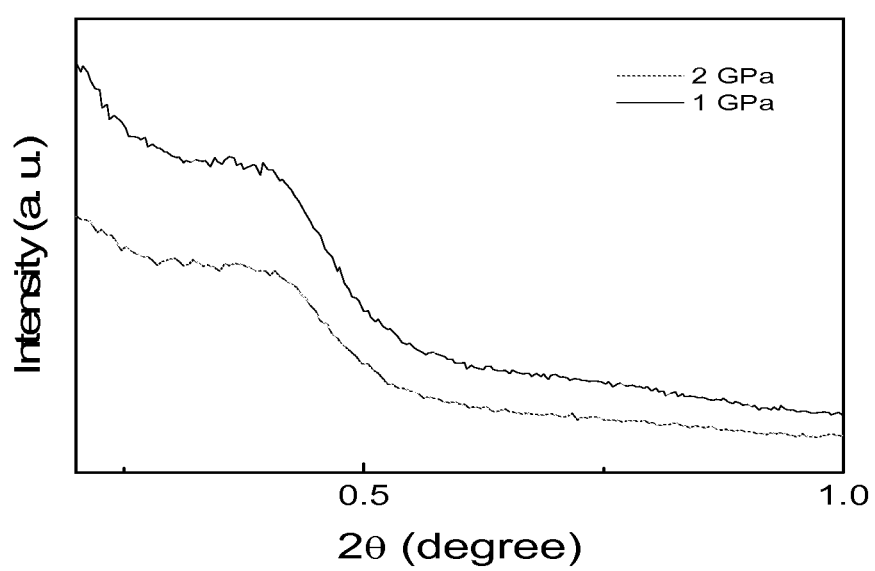
FIG. 6 is a graph that illustrates a small angle X-ray diffraction pattern of large-pore periodic mesoporous quartz synthesized at 2 GPa and the product prepared at 1 GPa in accordance with the present invention.

FIG. 6 illustrates a small angle X-ray diffraction pattern of large-pore periodic mesoporous quartz synthesized at 2 GPa and the product prepared at 1 GPa in accordance with the present invention.

Figure 7:
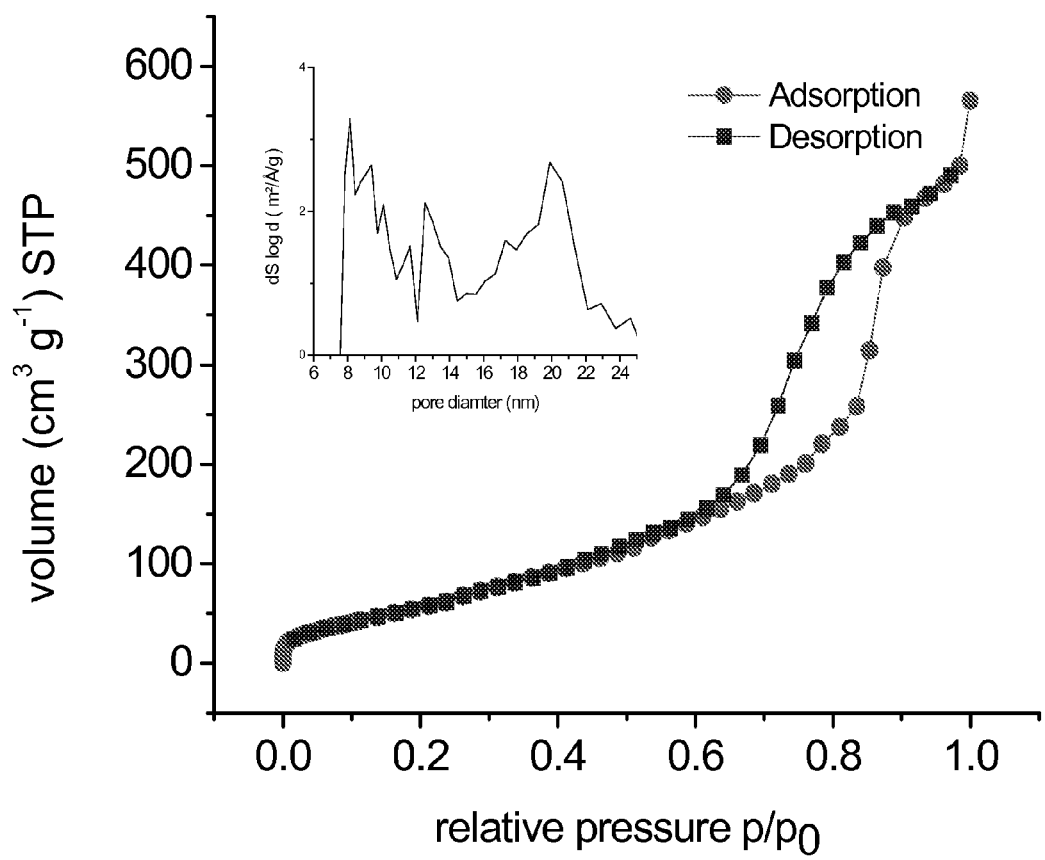
FIG. 7 is a chart showing a Nitrogen isotherm (77 K) of periodic mesoporous quartz synthesized at 2 GPa and pore size distribution in accordance with the present invention.

FIG. 7 illustrates Nitrogen isotherm (77 K) of periodic mesoporous quartz synthesized at 2 GPa and pore size distribution as calculated by DFT methods in accordance with the present invention.

Figure 8A:
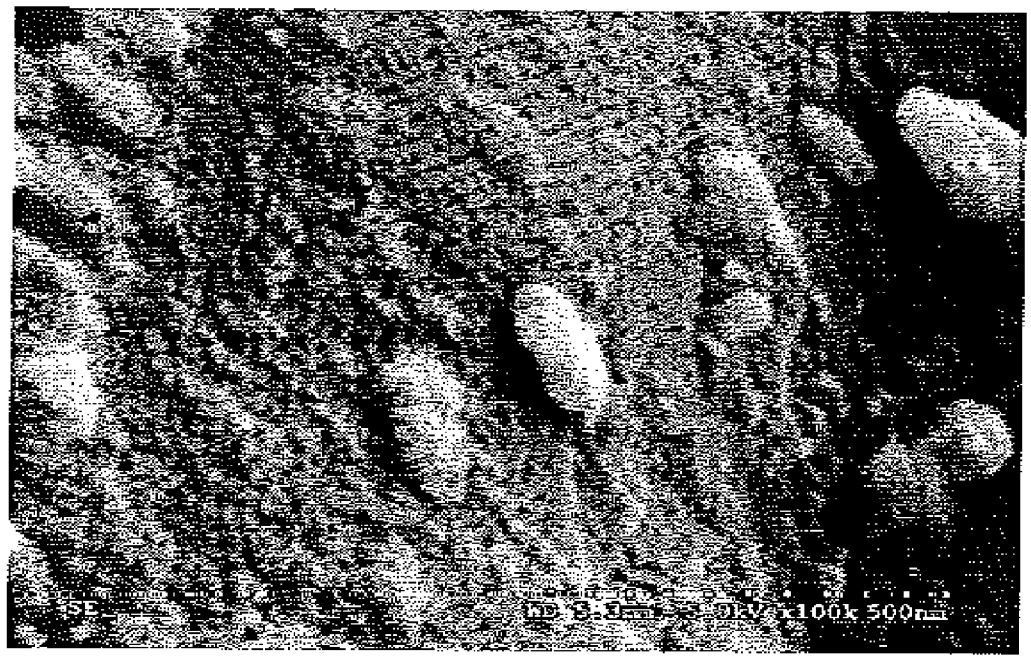
FIG. 8(a) is a SEM image of large-pore periodic mesoporous quartz treated at 800° C. in pure steam for 2 h. in accordance with the present invention.
Figure 8B:
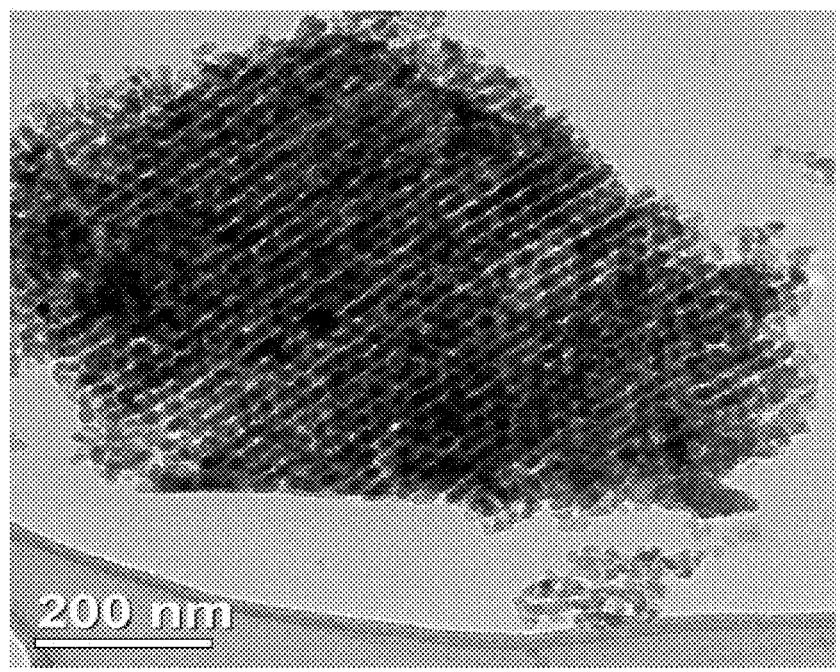
FIG. 8(b) is a TEM image of large-pore periodic mesoporous quartz treated at 800° C. in pure steam for 2 h. in accordance with the present invention.

FIG. 8(a) illustrates SEM and FIG. 8(b) illustrates SEM images t) of large-pore periodic mesoporous quartz treated at 800° C. in pure steam for 2 h. in accordance with the present invention.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the description there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. A method for synthesizing a mesoporous silica article with crystalline pore walls, the method comprising the steps of:
   a. providing a mesoporous silica starting material comprising silica and oxygen;
   b. infiltrating the mesoporous starting material with a carbon source to form an infiltrated starting material;
   c. placing the infiltrated starting material into a high-pressure apparatus; and
   d. subjecting the infiltrated starting material to a pressure greater than 1 GPa and lower than or equal to 4 GPa; and
   e. heating the infiltrated starting material at a temperature and for a time sufficient to crystallize the pore walls of the starting material to thereby form a mesoporous article that has crystalline pore walls and pores filled with carbon; and
   f. heating the mesoporous article to a temperature sufficient to oxidize the carbon, thereby removing carbon from the pores to yield a mesoporous silica article having crystalline pore walls.

2. The method of claim 1, wherein the step of heating is performed after the step of subjecting the infiltrated starting material to a pressure greater than 1 GPa and lower than or equal to 4 GPa.

3. The method of claim 2, wherein the temperature sufficient to oxidize the carbon is less than about 950° C.

4. The method of claim 2, wherein the step of infiltrating the mesoporous starting material with a carbon source further comprises the step of filling the mesopores of the starting material with a molten mesophase pitch.

5. The method of claim 1, wherein the step of providing a mesoporous starting material comprises providing the composition FDU-12.

6. The method of claim 1, wherein the step of subjecting the infiltrated starting material to a pressure greater than 1 GPa and lower than or equal to 4 GPa comprises increasing the pressure in the pressure vessel at a rate of not greater than about 1 GPa per hour.

7. The method of claim 6, wherein the temperature is less than about 950° C.

8. The method of claim 1, wherein the step of subjecting the infiltrated starting material to a pressure is performed in an atmosphere of inert gas.

9. The method of claim 1, wherein the pressure apparatus is a piston-cylinder apparatus.

10. The method of claim 9, wherein the temperature is between about 700° C. and about 750° C., and wherein the time sufficient to crystallize the pore walls is about 3 hours.

11. The method of claim 2, further comprising the step of, after the step of heating, depressurizing the pressure vessel at a rate of less than 1.5 GPa per hour.

12. The method of claim 1, wherein the step of heating the mesoporous article to a temperature sufficient to oxidize the carbon is performed in air.

13. The method of claim 1, wherein the starting material further comprises aluminum.

14. The method of claim 1, wherein the starting material consists essentially of silica and oxygen.

15. A method of synthesizing a mesoporous silica article having crystalline pore walls, the method comprising the steps of:
   a. providing a mesoporous starting material comprising silica and oxygen;
   b. infiltrating the mesoporous starting material with a carbon source to thereby form an infiltrated starting material;
   c. placing the infiltrated starting material into a piston-cylinder pressure apparatus; and
   d. subjecting the infiltrated starting material to a pressure of greater than 1 GPa and lower than or equal to 4 GPa at a pressure increase rate of less than about 1 GPa per hour;
   e. heating the pressurized infiltrated starting material to a temperature for a time sufficient to crystallize silica within the article to thereby form a mesoporous silica article having crystalline pore walls and further having pores filled with carbon; and
   f. relieving pressure on the mesoporous silica article; and
   g. heating the mesoporous silica article for a time sufficient to oxidize the carbon to yield a mesoporous silica article with crystalline pore walls consisting essentially of silica and oxygen.

* * * * *